(12) United States Patent
Ashbolt et al.

(10) Patent No.: US 7,313,468 B2
(45) Date of Patent: Dec. 25, 2007

(54) FORCE-CONTROLLED THROTTLE FOR ADJUSTING THE ENGINE THRUST OF A COMBAT AIRCRAFT

(75) Inventors: Clive Ashbolt, Ottobrunn (DE); Thomas Buro, Brunnthal (DE); Richard Haarmann, Stuttgart (DE)

(73) Assignee: EADS Deutschland GmbH, Ottobrunn (DE)

( * ) Notice: Subject to any disclaimer, the term of this patent is extended or adjusted under 35 U.S.C. 154(b) by 507 days.

(21) Appl. No.: 10/920,452

(22) Filed: Aug. 18, 2004

(65) Prior Publication Data
US 2005/0085958 A1    Apr. 21, 2005

(30) Foreign Application Priority Data
Aug. 19, 2003   (DE)   ................. 103 38 026

(51) Int. Cl.
B64D 31/04    (2006.01)
(52) U.S. Cl. ............................................. 701/3
(58) Field of Classification Search ............ None
See application file for complete search history.

(56) References Cited

U.S. PATENT DOCUMENTS

| 4,420,808 | A | * | 12/1983 | Diamond et al. ............. 701/4 |
| 4,477,043 | A | * | 10/1984 | Repperger .................. 244/223 |
| 4,513,235 | A | | 4/1985 | Acklam et al. |
| 4,907,970 | A | * | 3/1990 | Meenen, Jr. ................. 434/45 |
| 4,982,918 | A | | 1/1991 | Kaye |
| 5,065,962 | A | | 11/1991 | Adams et al. |
| 5,143,330 | A | * | 9/1992 | Kaye ........................ 244/234 |
| 5,264,768 | A | * | 11/1993 | Gregory et al. ............. 318/561 |

FOREIGN PATENT DOCUMENTS

| EP | 0 453 002 A1 | 2/1991 |
| EP | 0 326 439 A2 | 8/1991 |
| EP | 0 875 451 A2 | 11/1998 |
| GB | 2 313 176 A | 11/1997 |

* cited by examiner

Primary Examiner—Michael J. Zanelli
(74) Attorney, Agent, or Firm—Crowell & Moring LLP

(57) ABSTRACT

A force-controlled throttle for adjusting the engine thrust of a combat aircraft with a handle for operation by a pilot and with a signal generating device that is connected to the handle for generating a control signal used for adjusting the engine thrust. The signal generating device is provided for generating the control signal as a function of the force exerted by the pilot on the handle in operation. The throttle may include force-controlled elements for control of an afterburner.

23 Claims, 5 Drawing Sheets

FORCE-CONTROLLED THROTTLE FOR ADJUSTING THE ENGINE THRUST OF A COMBAT AIRCRAFT

This application claims the priority of 103 38 026.4, filed Aug. 19, 2003, the disclosure of which is expressly incorporated by reference herein.

BACKGROUND AND SUMMARY OF THE INVENTION

This invention relates to a force-controlled throttle for adjusting the engine thrust of a combat aircraft.

In a combat aircraft, the engine thrust is regulated by the pilot via the throttle, i.e., a manually operated thrust lever (also known as a throttle lever). The normal control range is from idling to full thrust (max dry, i.e., without afterburner fuel injection). In addition, if an afterburner is provided, it may be turned on, regulated and turned off (min/max afterburner). The thrust lever is traditionally adjusted for a length of approximately 150 to 200 mm for this purpose.

The throttle should fulfill various ergonomic requirements regarding the force, displacement and movement characteristics so that the pilot can adjust the thrust quickly and accurately. In a landing, for example, very precise and accurate information must be input. The throttle must not jerk. However, unintentional input should be avoided, so the force required to make an adjustment should not be too low. The afterburner must be clearly separated, so that unintentional selection of the afterburner is impossible. These requirements have resulted in the development of complex and expensive electronic throttles known as force feedback throttle units.

A throttle is presumed as already known, i.e., a thrust lever for adjusting the engine thrust of a combat aircraft having a handle for operation by a pilot and a signal generating device connected to the handle for generating a control signal that is used to adjust the engine thrust.

Throttles of this type that are known currently operate with a lever which supports the handle and is connected to the signal generating device; this lever is mounted so it is linearly or rotatably displaceable about an axis in the manner of a rotating movement.

The engines in modern airplanes are regulated electronically (by wire) and nevertheless the type of operation based on the requirements of older planes in which the engines are regulated by a lever system (e.g., MiG 29) has been retained. Traditionally the afterburner range is separated via a crank (lateral movement of the handle) or by an additional force that must be overcome or by an additional lever to be operated. However, there are some disadvantages to this conventional design, based on the requirements of a modern combat aircraft. Friction in the mechanics prevents accurate input. Devices having mechanical friction brakes require frequent maintenance and adjustment work. In a trainer aircraft, the throttles must be connected so they are all in the same position. In addition, the instructor must have the opportunity to take over the controls completely. With a mechanical linking of the throttles, this may be accomplished only with considerable effort by means of a lever system between the front cockpit and the rear cockpit.

The object of this invention is to create an improved throttle for adjusting the engine thrust of a combat aircraft.

This object is achieved according to this invention by a power throttle having a handle and a signal generating device for generating a control signal used for adjusting the engine torque, wherein the signal generating device generates the control signal as a function of the force exerted on the handle by the pilot in operation.

This invention creates a force-controlled throttle for adjusting the engine thrust of a combat aircraft with a handle for operation by a pilot and a signal generating device connected to the handle for generating a control signal for adjusting the engine thrust. According to this invention, the signal generating device is provided for generating the control signal as a function of the force exerted on the handle in operation by the pilot.

Thus the inventive solution consists of a force-controlled throttle which hardly moves at all in comparison with the traditional displacement-controlled thrust levers. The thrust is controlled on the basis of the force exerted on the throttle. Pushing forward increases the engine power, whereas pulling toward the rear reduces it. Because of the small movement, the throttle handle can be separated by a lever arm from the mechanism, i.e., the signal generating device which is connected to the handle. The throttle handle can be arranged at the optimum height (at the same level as the pilot's heart). The throttle mechanics can be installed separately in the side wall of the cockpit. This creates additional space for displays and controls in the cockpit. Because of the small size, this throttle can be installed by retrofitting an existing aircraft. It is particularly advantageous that the engine may be regulated very accurately through precise input.

According to a particularly preferred embodiment of the inventive force-controlled throttle, the signal generating device comprises an elastic actuator element which is resilient in response to the force exerted by the pilot and a signal generator which is functionally connected to the actuator element for generating the control signal so that it represents the force exerted by the pilot on the handle, and comprises an actuator signal generating device whose signal is connected to the signal generator for generating from the control signal an actuator signal that represents the absolute value of the engine thrust to be adjusted.

The actuator element here is preferably arranged so that it is movable over a predetermined actuator displacement according to a force exerted by the pilot, and the signal generator functionally linked to the actuator element is provided for generating a control signal that corresponds to the actuator displacement.

The actuator element is preferably pivotably or displaceably mounted and is connected to a spring device which generates an opposing force which counteracts the movement over the predetermined actuator displacement.

According to a preferred embodiment of this invention, the actuator element is arranged so that it is movable starting from a force-free basic position in a first direction or in a second direction opposite the first direction according to the force exerted by the pilot, whereby the signal generator is provided for a movement in the first direction to generate control signals in the sense of an increase in the engine thrust and for a movement in the second direction to generate control signals in the sense of a reduction in engine thrust.

According to another preferred embodiment of this invention, the signal generator generates a control signal which changes steadily with the size of the actuator displacement.

According to a preferred embodiment of this invention, it is also provided that the actuator element is movable in the first direction between the basic position and a first stop, which corresponds to a maximum force in the first direction, and in the second direction between the basic position and a second stop, which corresponds to a maximum force in the second direction, whereby the signal generator generates control signals corresponding to an increase in engine thrust when the actuator element is moved in the first direction and corresponding to a reduction in engine thrust when the actuator element is moved in the second direction.

According to another preferred embodiment of this invention, it is provided that for aircraft having an afterburner, a first defined position is provided in the actuator displacement of the actuator element in the first direction between the basic position and the first stop beyond which the actuator displacement can be increased in the first direction only when a definite discontinuous increase in the force exerted by the pilot, such that when the afterburner has been turned off, the signal generator generates a control signal corresponding to turning the afterburner on when there is an increase in the actuator displacement beyond the defined position.

According to a preferred embodiment of this invention, a second defined position is provided in the actuator displacement of the actuator element in the second direction between the basic position and the second stop; beyond this second defined position, the actuator displacement of the actuator element in the second position can be increased only with a definite discontinuous increase in the force exerted by the pilot, whereby when the afterburner is turned on and the actuator displacement is increased beyond the second defined position, the signal generator generates a control signal corresponding to turning off the afterburner. According to a preferred embodiment of this invention, when the afterburner is turned off, movement of the actuator element in the first direction between the basic position and the first defined position corresponds to an increase in the engine thrust up to maximum thrust without the afterburner.

According to a preferred embodiment of this invention, a movement of the actuator element in the first direction between the basic position and the first defined position when the afterburner is turned on corresponds to an increase in the engine thrust up to maximum thrust with the afterburner.

Preferably a movement of the actuator element in the second direction between the basic position and the second defined position when the afterburner is turned off corresponds to a reduction in the engine thrust to idling.

When the afterburner is turned on, a movement of the actuator element in the second direction between the basic position and the second defined position preferably corresponds to a reduction in the engine thrust down to minimal thrust with the afterburner.

According to a preferred embodiment of this invention, the actuator element is formed by a lever arm of a lever mounted to rotate about an axis of rotation, the end of the lever supporting the handle operated by the pilot.

The lever is preferably a two-way lever mounted to rotate about an axis of rotation provided in the central area, its one lever arm carrying the handle to be operated by the pilot and its other lever arm forming the actuator element.

According to a preferred embodiment of this invention, the spring device is formed by spring elements coupled to the actuator element in the direction of movement of the actuator element.

According to a particularly preferred embodiment of this invention, the spring elements are arranged in pairs on opposite sides on both ends of the actuator element in the direction of movement of the actuator element.

According to a particularly preferred embodiment of this invention, a first pair of spring elements and a second pair of spring elements are provided, arranged in pairs on both sides of the actuator element opposite one another in the direction of movement of the actuator element, with the first pair of spring elements generating a counterforce which increases steadily between the basic position and the first and second stops on the actuator element against the force exerted by the pilot on the handle, and the second pair of spring elements generating an additional counterforce when the first and/or second defined position is exceeded.

The first pair of spring elements is preferably situated a greater distance away from the axis of rotation and the second pair of spring elements is preferably situated closer to the axis of rotation.

According to a preferred embodiment of this invention, the spring elements include a spiral spring, a plunger connected between the spiral spring and the actuator element and a pressure plate which is displaceable by means of a threaded pin in the sense of a change in the spring bias.

The spring device preferably generates a spring bias suitable for creating a breakout force appropriate for moving the actuator element out of the basic position.

The signal generator is preferably formed by a linear potentiometer.

The linear potentiometer may be connected to the actuator element by an operating pin.

The signal generating device may be formed by an onboard computer of the aircraft or by a separate electronic switch.

According to a preferred embodiment of this invention, the spring elements and the signal generator are arranged in a housing box on which is also rotatably mounted the lever which carries the actuator element and the handle.

According to a preferred embodiment of this invention, the housing box is bordered by two opposing housing plates arranged on opposite sides of the actuator element and extending parallel to the direction of movement of the actuator element with the spring elements and the signal generator being mounted on the plates.

Other objects, advantages and novel features of the present invention will become apparent from the following detailed description of the invention when considered in conjunction with the accompanying drawings.

DETAILED DESCRIPTION OF THE DRAWINGS

Figure 1:
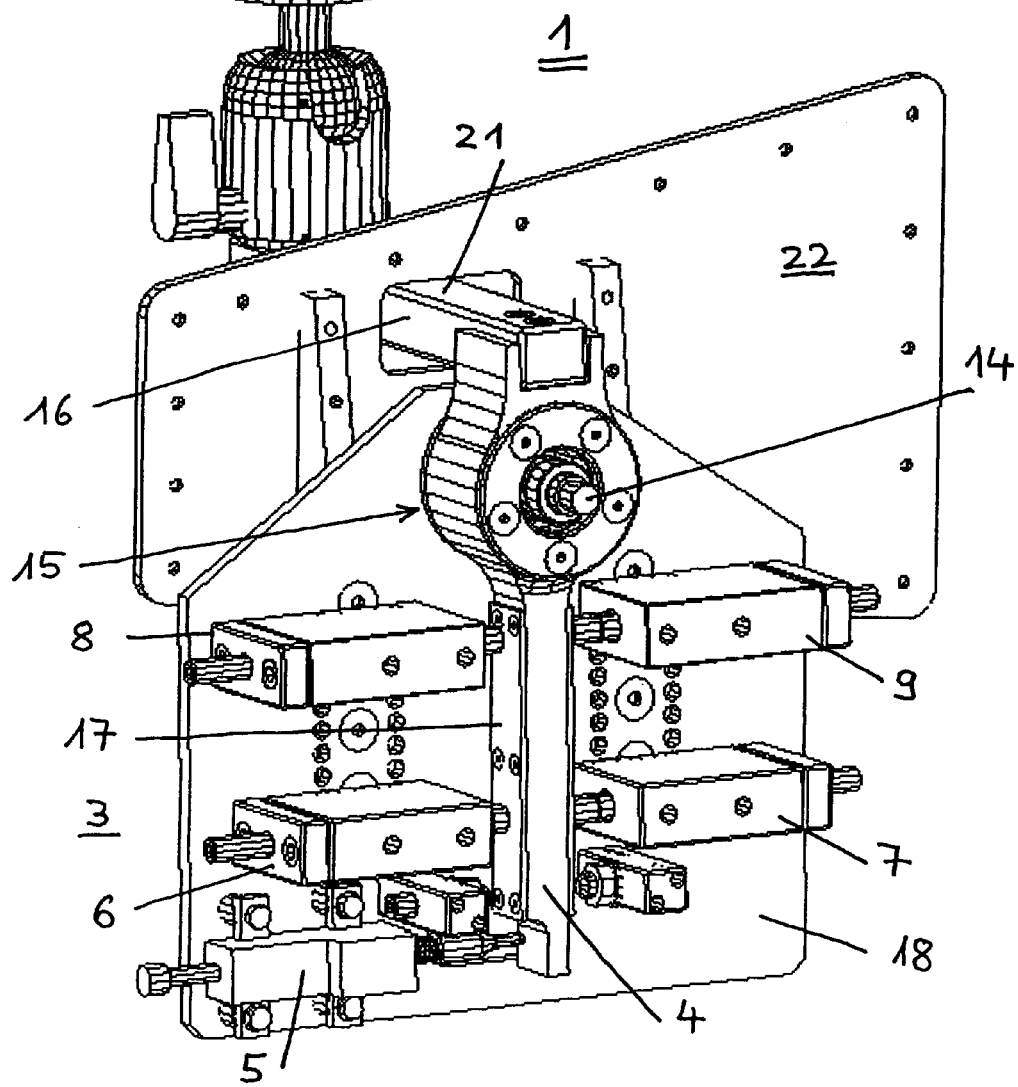
FIG. 1 shows a perspective diagram of a force-controlled throttle for adjusting the engine thrust of a combat aircraft according to a preferred exemplary embodiment of this invention, whereby a housing box containing the signal generating device is illustrated as open, as seen from the rear end of the box.
Figure 2:
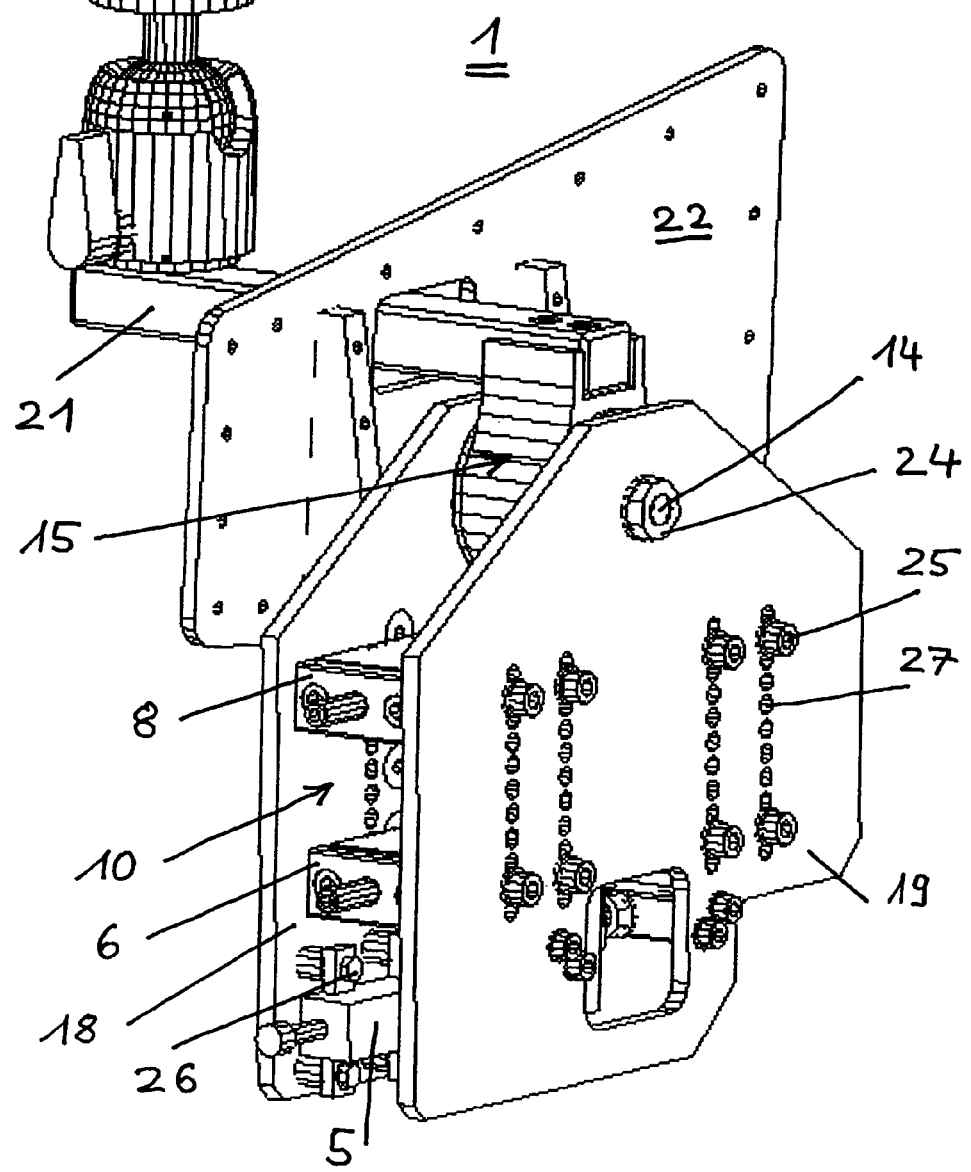
FIG. 2 shows a perspective view of the force-controlled throttle according to the exemplary embodiment depicted in FIG. 1 with a closed housing box, likewise as seen from the rear.
Figure 3:
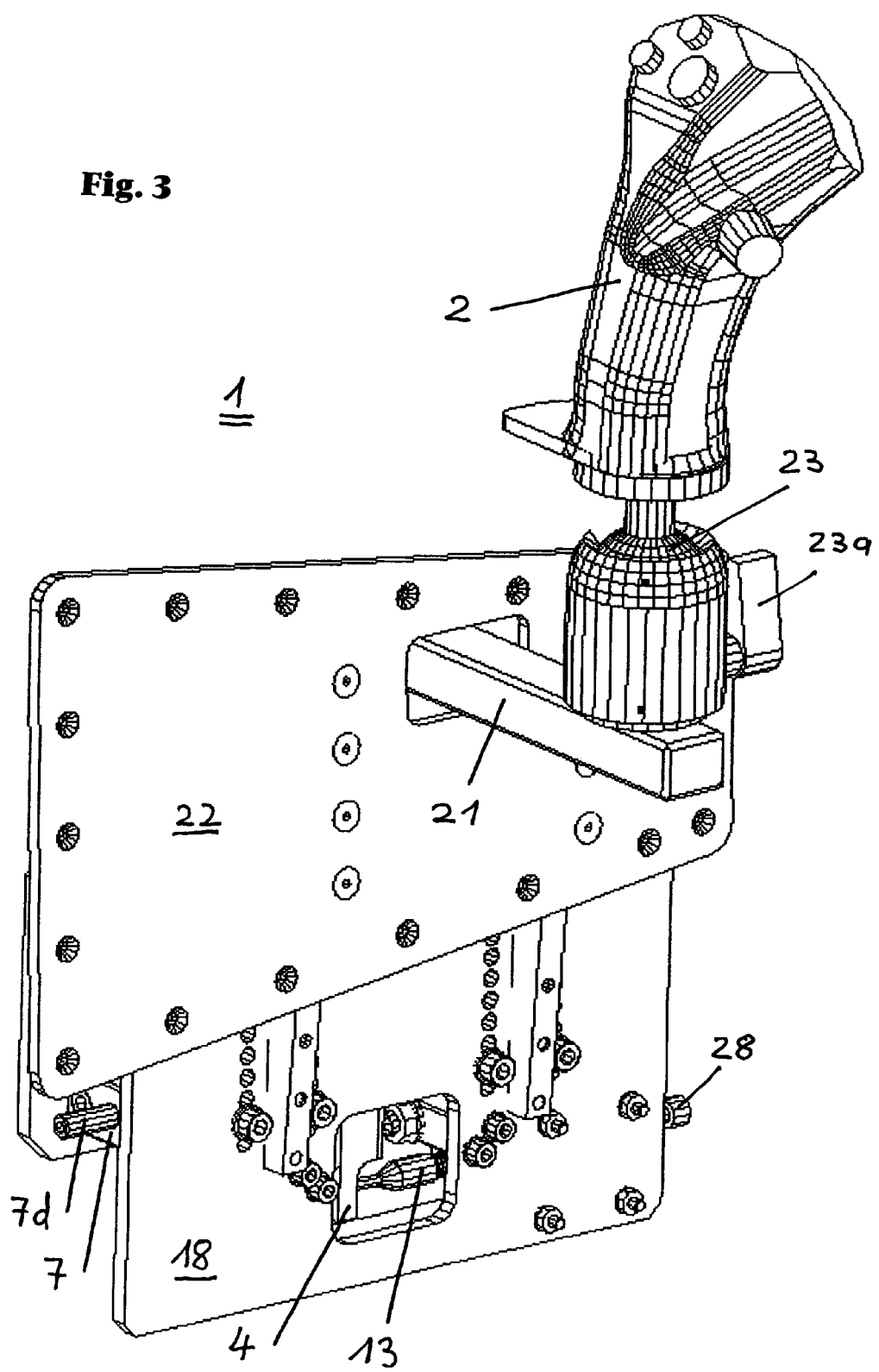
FIG. 3 shows a perspective view of the force-controlled throttle according to the exemplary embodiment depicted in FIG. 1 and FIG. 2 as seen from the front end.

FIG. 1 through FIG. 3 show a force-controlled throttle in various perspective diagrams, i.e., a force-controlled thrust lever for adjusting the engine thrust of a combat aircraft according to an exemplary embodiment of this invention, which is labeled on the whole with reference number 1.

The force-controlled throttle 1 comprises a handle 2, which is provided for operation by a pilot. A signal generating device, labeled on the whole with reference number 3, is connected to the handle 2 and serves to generate a control signal, which is used to adjust the engine thrust of the combat aircraft in a manner to be described in greater detail below. The signal generating device 3 generates this control signal as a function of the force exerted by the pilot on the handle 2, i.e., as a function of its direction, i.e., whether forward or to the rear, and as a function of its force.

The signal generating device 3 contains an elastic actuator element 4 and a signal generator 5 functionally connected to the actuator element 4, namely in the form of a linear potentiometer in the exemplary embodiment depicted here. The signal generator 5 is provided for generating the control signal mentioned above, so that it represents the force exerted by the pilot on the handle 2.

The throttle 1 includes a two-way lever 15 which is mounted in a central area to rotate about an axis of rotation 14 over a certain predetermined but relatively small angle range and whose one lever arm 16 carries the handle 2 to be operated by the pilot and whose other lever arm 17 carries, i.e., forms, the actuator element 4. The handle 2 is connected by a collar arm 21 to the first lever arm 16, with a ball joint 23 being provided between the collar arm 21 and the handle 2 again as shown in particular in FIG. 3, said ball joint being releasably lockable by an adjusting screw 23a in various positions to take into account the particular ergonomic needs of the pilot.

The actuator element 4 is movable over a predetermined actuator displacement according to the force exerted by the pilot on the handle 2 so that the signal generator 5 which is connected to the actuator element 4, namely at its lower end, generates the control signal according to the actuator displacement of the actuator element 4. A counterforce which counteracts the movement over the predetermined actuator displacement and thus counteracts the force exerted by the pilot on the handle 2 is exerted on the actuator element 4 by means of a spring device formed by two pairs of spring elements 6, 7, 8, 9.

The spring elements 6, 7, 8, 9 forming the spring device are active in the direction of movement of the actuator element 4, a first pair of spring elements 6, 7 being arranged further away from the axis of rotation 14, i.e., further toward the bottom and a second pair of spring elements 8, 9 being arranged closer to the axis of rotation 14, i.e., farther to the top. The spring elements 6, 7 of the first pair and the spring elements 8, 9 of the second pair are arranged opposite one another on different sides of the actuator element 4.

The spring elements 6, 7, 8, 9 and the signal generator 5 are arranged in a housing box 10 (see FIG. 2 in particular) on which the lever 15 which forms the actuator element 4 and carries the handle 2 is mounted so it can rotate about the axis of rotation 14. In the exemplary embodiment depicted here, the housing box 10 is bordered at the side by two opposing housing plates 18, 19 each being arranged at the site of the actuator element 4 and extending parallel to the direction of movement of the actuator element 4. These housing plates 18, 19 support the spring elements 6, 7, 8, 9 by means of mounting screws 25 which are screwed through holes 27 in the housing plates 18, 19 and also support the signal generator 5, which is bolted onto the first housing plates 18 by means of mounting screws 25 (see again FIG. 2). When, as in the exemplary embodiment depicted here, several mutually offset holes 27 are provided for the mounting screws 25, the spring elements 6, 7, 8, 9 may be mounted at different heights so that they act on the actuator element 4 and thus act on the second lever arm 17 of the lever 15 with different effective lever arms. This is useful for experimental and testing purposes in particular.

Figure 4:
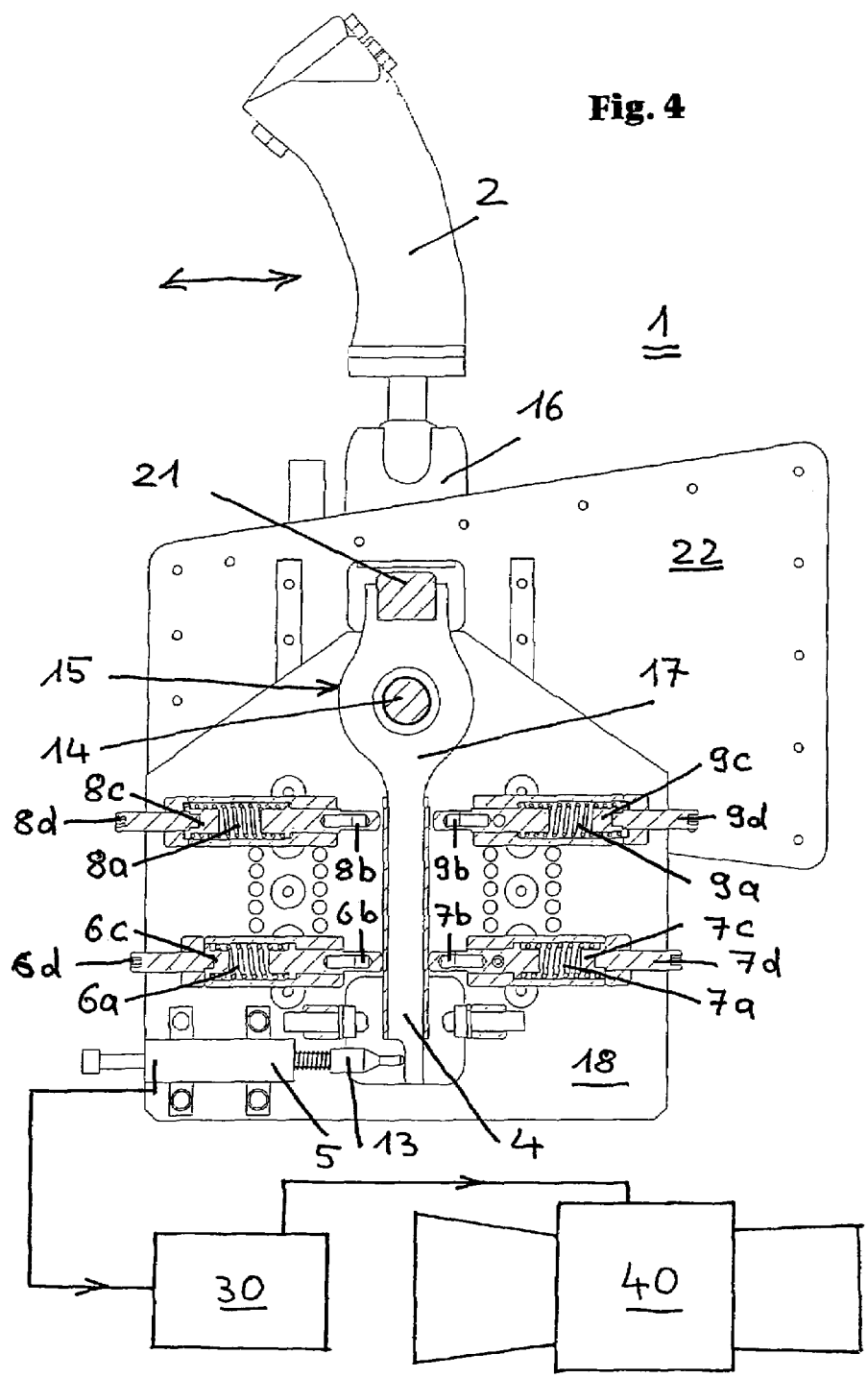
FIG. 4 shows a side view of the force-controlled throttle of the exemplary embodiment of this invention depicted in FIG. 1 through FIG. 3 in a sectional view as seen from the rear and additionally with a highly schematic function diagram.

As FIG. 4 shows, the spring elements 6, 7, 8, 9 each include a spiral spring 6a, 7a, 8a, 9a, a plunger 6b, 7b, 8b, 9b connected between the spiral springs and the actuator element 4 and a pressure plate 6c, 7c, 8c, 9c being displaceable by means of a threaded pin 6d, 7d, 8d, 9d in the sense of a change in the spring bias. The signal generator 5 includes an adjusting screw 28 with which an operating pin 13 is adjustable, this pin being held by a spring 13a against the actuator element 4, under a spring bias.

As FIG. 4 also shows, the signal generator 5, which generates the control signal representing in size and direction the force exerted on the handle 2, is connected to a signal generating device 30 which in turn generates an actuator signal representing the absolute value of the thrust of the engine 40. Actuator signal generating device 30 and engine 40 are shown in FIG. 4 in greatly simplified and schematized form. In particular, in addition to receiving the control signal of the signal generator 5, the actuator signal generating device 30 of course also receives a plurality of other parameters as input variables (not indicated in FIG. 4), which is also true accordingly for the engine 40. The actuator signal generating device 30 may be formed by an onboard computer or by a separate electronic circuit of the aircraft.

The first pair of spring elements 6, 7 holds the actuator element 4 in a force-free basic position and generates a steadily increasing counterforce against the force exerted by the pilot on the handle 2 in the first and/or second direction and it does so between a first stop which limits the movement of the actuating element 4 in the first direction and a second stop which limits the movement of the actuating element 4 in the second direction.

In addition, the second pair of spring element 8, 9 generates an additional discontinuous increase in counterforce which is thus definitely perceptible by the pilot. The force to be exerted by the pilot on the handle 2 is increased by this counterforce after exceeding the first and/or second defined position(s).

In addition it is provided that the first pair of spring elements 6, 7 generates an adjustable spring bias which is such that a certain breakout force is necessary for moving the actuator element 4 away from the force-free basic position and this prevents unintentional movement of the handle 2 or movement that is too light.

Figure 5:
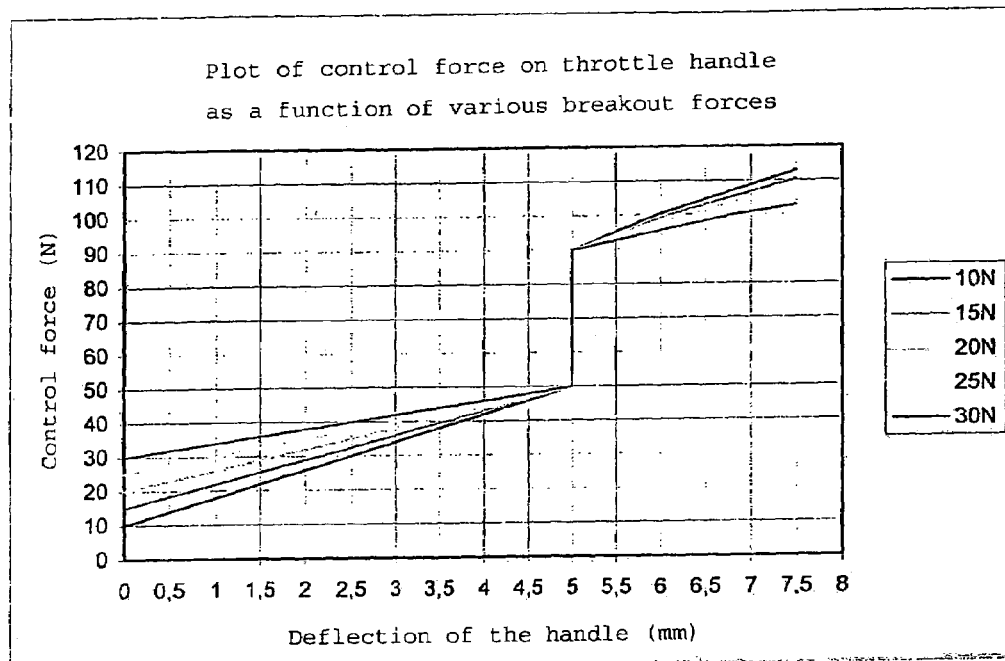
FIG. 5 shows a diagram which illustrates a plot of the control force on the handle of the force-controlled throttle as a function of the displacement and of different releasing forces.

FIG. 5 shows a plot of the control force on the handle 2 in a direction which depends on the deflection of the handle from the force-free basic position for essential breakout forces, whereby in the case of a 5 mm deflection, the counterforce additionally acting due to the second pair of spring elements 8, 9 is definitely perceptible and in this case the position assumed is the defined position (5 mm) which is mentioned above as being between the basic position (0 mm) and the stop (7.5 mm).

The actuator element 4 is thus movable from the force-free basic position in the first direction (toward the front) or in a second direction opposite the first direction (toward the rear) according to the force exerted by the pilot on the handle 2. A signal generator 5 here generates a control signal when there is movement in the first direction and this control signal is analyzed by the actuator signal generating device 30 in the sense of an increase in engine thrust and when there is a movement in the second direction, it generates a control signal which is analyzed by the actuator signal generating device 30 in the sense of a reduction in engine thrust. The control signal generated by the signal generator 5 is a control signal which varies continuously with the size of the actuator displacement and/or the movement of the actuator element 4, i.e., the resistance of the linear potentiometer, which forms the signal generator 5, increases steadily from one stop, e.g., the first stop, to the next stop, e.g., then to the second stop, or conversely at any rate there is a definite correlation between the control signal, i.e., the resistance of the signal generator 5 and the position of the actuator element 4.

On the whole, the actuator element 4 is movable in the first direction between the force-free basic position and the first stop, which corresponds to a maximum force in the first direction, and is movable in the second direction between the force-free basic position and the second stop, which corresponds to a maximum force in the second direction. The plot of the force in both directions is like the plot shown in FIG. 5 but with the opposite direction of the force. The plot of the control force may of course be different for the two directions according to the slope and size of the deflection if this offers advantages ergonomically or in terms of the technical aspects of operation.

When there is a movement of the actuator element 4 in the first direction, the signal generator 5 generates a control signal which corresponds to an increase in the engine thrust, and when there is a movement of the actuator element 4 in the second direction the signal generator generates a control signal corresponding to a reduction in the engine thrust.

As already explained above and as illustrated in FIG. 5, a first defined position is provided in the actuator displacement of the actuator element 4 in the first direction between the basic position and the first stop; beyond this position, the actuator displacement can be increased in the first direction only with a definitely perceptible discontinuous increase in the force exerted by the pilot and likewise in the actuator displacement of the actuator element 4 in the second direction between the basic position and the second stop, a second defined position is provided, such that beyond this second position the actuator displacement in the second direction can again be enlarged only with a definitely perceptible discontinuous increase in the force exerted by the pilot on the handle 2. This is used to control the afterburner, if such is provided.

An increase in the actuator displacement beyond the first defined position in combination with a corresponding change in the control signal generated by the signal generator 5 is interpreted by the actuator signal generating device 30 with the afterburner turned off as a signal for turning on the afterburner. Accordingly, an increase in the actuator displacement in the second direction beyond the second defined position, which is in turn associated with a corresponding change in the control signal delivered by the signal generator 5, is interpreted by the actuator signal generating device 30 when the afterburner is turned on as a signal for turning off the afterburner.

With the afterburner turned off, a movement of the actuator element 4 in the first direction starting from the basic position up to the first defined position corresponds to an increase in engine thrust up to the maximum thrust without the afterburner (max dry).

With the afterburner turned on, a movement of the actuator element 4 in the first direction between the basic position and the first defined position corresponds to an increase in the engine thrust up to maximum thrust with the afterburner (max afterburner).

With the afterburner turned off, a movement of the actuator element 4 in the second direction starting from the basic position up to the second defined position corresponds to a reduction in the engine thrust down to idling.

With the afterburner turned on, a movement of the actuator element 4 in the second direction starting from the basic position up to the second defined position corresponds to a reduction in the engine thrust down to minimal thrust with afterburner (min afterburner).

Due to the force-controlled throttle, starting with a force-free basic position of the handle 2, the engine thrust can be regulated between idle and full thrust without the afterburner (max dry) starting from a force-free basic position of the handle 2 after exceeding an initial breakout force over an adjustment range of 5 mm to 12 mm, for example, extending up to the first defined position. At the end of this range, i.e., at the first defined position, the pilot perceives an increased resistance. If the pilot overcomes this resistance (see the step in FIG. 5), then the afterburner is ignited. After this step, the handle 2 can be moved further by approximately 2 mm to 3 mm and it returns to the starting position after releasing the handle 2. The pilot can then adjust the engine power in the control range mentioned above, which is from 5 mm to 12 mm between the force-free basic position and the first defined position, increasing the thrust between minimal thrust with the afterburner (min afterburner) and maximum thrust with the afterburner (max afterburner). The engine power is reduced by a pulling movement on the handle 2. Following the movement between the force-free basic position and the second defined position, the pilot again perceives a resistance with a discontinuous increase in force (see FIG. 5). If the pilot overcomes this resistance, the afterburner is turned off and the pilot can slow the engine thrust down to idling.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Force-controlled throttle for adjusting the engine thrust of a combat aircraft, comprising:
   a handle for operation by a pilot; and
   a signal generating device connected to the handle for generating a control signal used for adjusting the engine torque,
   wherein the signal generating device is provided for generating the control signal as a function of the force exerted on the handle by the pilot in operation,
   wherein the signal generating device
      contains an elastic actuator element which is resilient against the force exerted by the pilot, contains a signal generator connected to the actuator element for generating the control signal, so that it represents the force exerted on the handle by the pilot, and contains an actuator signal generating device whose signal is connected to the signal generator for generating from the control signal an actuator signal representing the absolute value of the engine thrust to be set, and wherein the actuator element is arranged according to a force exerted by the pilot so that it is movable over a predetermined actuator displacement, and is pivotably or displaceably mounted and is connected to a spring device which generates a counterforce acting against the movement over the predetermined actuator displacement.

2. Force-controlled throttle as claimed in claim 1, wherein the actuator element is arranged according to a force exerted by the pilot so that it is movable starting from a force-free basic position in a first direction or in a second direction opposite the first direction, whereby the signal generator is provided for generating control signals in the sense of an increase in the engine thrust when there is a movement in the first direction and for generating control signals in the sense of a reduction in the engine thrust when there is a movement in the second direction.

3. Force-controlled throttle as claimed in claim 2, wherein the actuator element is movable in the first direction between the basic position and a first stop which corresponds to a maximum force in the first direction and in the second direction between the basic position and the second stop which corresponds to a maximum force in the second direction, whereby the signal generator generates control signals corresponding to an increase in engine thrust when there is a movement of the actuator element in the first direction and generates control signals corresponding to a reduction in engine thrust when there is a movement of the actuator element in the second direction.

4. Force-controlled throttle as claimed in claim 3, wherein a first defined position is provided in the actuator displacement of the actuator element in the first direction between the basic position and the first stop such that beyond this first defined position the actuator displacement in the first direction can be increased only with a definite discontinuous increase in the force exerted by the pilot, and when there is an increase in the actuator displacement beyond the defined position when the afterburner is turned off, the signal generator generates a control signal that corresponds to turning on the afterburner.

5. Force-controlled throttle as claimed in claim 4, wherein a movement of the actuator element in the first direction between the basic position and the first defined position when the afterburner is turned off corresponds to an increase in the engine thrust up to the maximum thrust without afterburner.

6. Force-controlled throttle as claimed in claim 4, wherein a movement of the actuator element in the first direction between a basic position and the first defined position with the afterburner turned on corresponds to an increase in the engine thrust up to the maximum thrust with afterburner.

7. Force-controlled throttle as claimed in claim 3, wherein a second defined position is provided in the actuator displacement of the actuator element in the second direction between the basic position and the second stop, such that beyond this second defined position, the actuator displacement of the actuator displacement of the actuator element in the second direction can be increased only with a definite discontinuous increase in the force exerted by the pilot, whereby in the case of an increase in the actuator displacement beyond the second defined position, the signal generator generates a control signal corresponding to shutdown of the afterburner in the case when the afterburner is already on.

8. Force-controlled throttle as claimed in claim 7, wherein the movement of the actuator element in the second direction between the basic position and the second defined position with the afterburner turned off corresponds to a reduction in the engine thrust down to idling.

9. Force-controlled throttle as claimed in claim 7, wherein a movement of the actuator element in the second direction between the basic position and the second defined position with the afterburner turned on corresponds to a reduction in the engine thrust down to minimal thrust with afterburner.

10. Force-controlled throttle as claimed in claim 1, wherein the signal generator generates a control signal that changes steadily with the size of the actuator displacement.

11. Force-controlled throttle as claimed in claim 1, wherein the actuator element is formed by a lever arm of a lever which is mounted to rotate about an axis of rotation, its end supporting the handle operating by the pilot.

12. Force-controlled throttle as claimed in claim 11, wherein the lever is a two-way lever mounted so that it can rotate about an axis of rotation provided in a central area, its one lever arm supporting the handle to be operated by the pilot and its other lever arm forming the actuator element.

13. Force-controlled throttle as claimed in claim 1, wherein the spring device is formed by spring elements that are linked to the actuator element and are active in the direction of movement of the actuator element.

14. Force-controlled throttle as claimed in claim 13, wherein the spring elements are arranged in pairs opposite one another on both sides of the actuator element in the direction of movement of the actuator element.

15. Force-controlled throttle as claimed in claim 14, wherein a first pair of spring elements and a second pair of spring elements are provided, arranged in pairs opposite one another in the direction of movement of the actuator element on both sides of the actuator element, the first pair of spring elements creating a counterforce which increases steadily between the basic position and the first and/or second stops of the actuator element acting against the force exerted by the pilot on the handle, and the second pair of spring elements produces an additional counterforce on exceeding the first and/or second defined position.

16. Force-controlled throttle as claimed in claim 15, wherein the first pair of spring elements is situated farther away from the axis of rotation and the second pair of spring elements is situated closer to the axis of rotation.

17. Force-controlled throttle as claimed in claim 13, wherein each spring element comprises a spiral spring, a plunger connected between the spiral spring and the actuator element and comprises a pressure plate that is displaceable by means of a threaded pin in the sense of a change in the spring bias.

18. Force-controlled throttle as claimed in claim 13, wherein the spring elements and the signal generator are situated in a housing box on which the lever carrying the actuator element and the handle is rotatably mounted.

19. Force-controlled throttle as claimed in claim 18, wherein the housing box is bordered by two opposing housing plates which are arranged in opposition to one another laterally from the actuator element and by housing plates extending parallel to the direction of movement of the actuator element, with the spring elements and the signal generator mounted on them.

20. Force-controlled throttle as claimed in claim 1, wherein the spring device creates a spring bias measured as the breakaway force required to move the actuator element out of the basic position.

21. Force-controlled throttle as claimed in claim 1, wherein the signal generator is formed by a linear potentiometer.

22. Force-controlled throttle as claimed in claim 21, wherein the linear potentiometer is connected by an operating pin to the actuator element.

23. Force-controlled throttle as claimed in claim 1, wherein the signal generating device is formed on one of an onboard computer of the vehicle and by a separate electronic circuit.

* * * * *